June 24, 1969
R. J. SLATER ET AL
3,452,355
INFLATABLE COMMUNICATIONS SATELLITE
Filed June 11, 1962
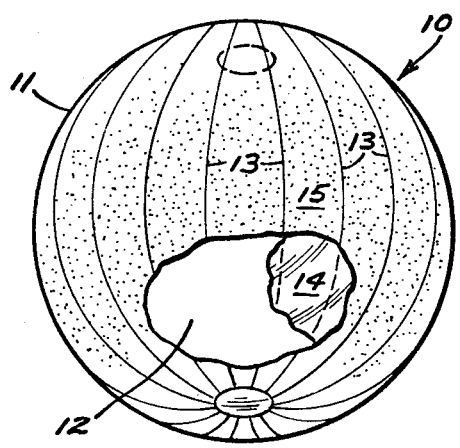
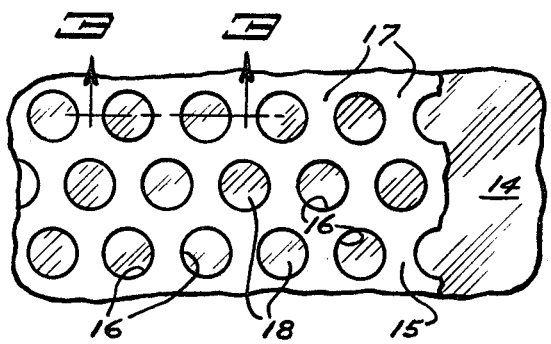
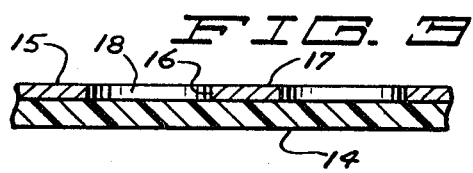
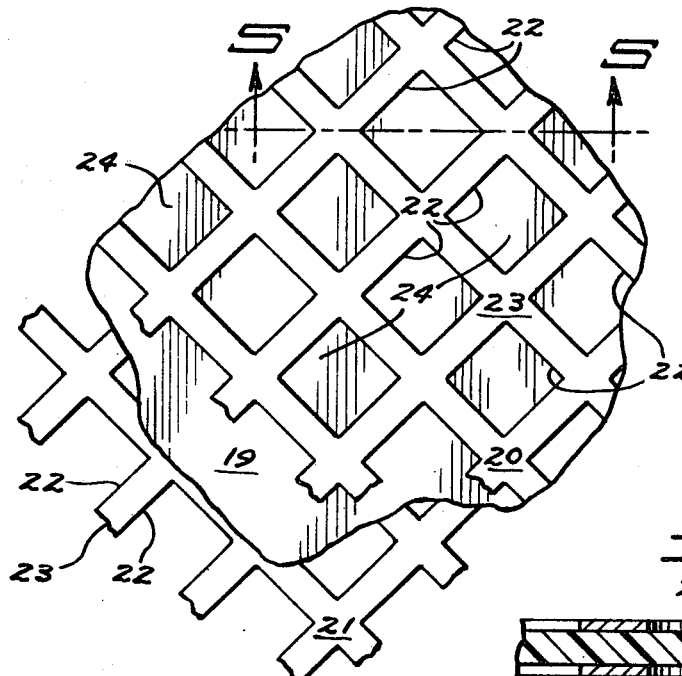
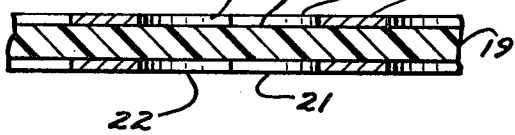
INVENTORS
RICHARD J. SLATER
FRANCIS H. BRATTON
BY *Meyers & Peterson*
ATTORNEYS U̇nited States Patent Office 3,452,355
Patented June 24, 1969

3,452,355
INFLATABLE COMMUNICATIONS SATELLITE
Richard J. Slater and Francis H. Bratton, Northfield, Minn., assignors to G. T. Schjeldahl Company, Northfield, Minn., a corporation of Minnesota
Filed June 11, 1962, Ser. No. 201,367
Int. Cl. H04b 7/20; H01q 15/18
U.S. Cl. 343—18      5 Claims This invention relates to a fabricated satellite for radio wave reflection and more particularly to a balloon-type satellite constructed from flexible thin web material and inflatable to full size as the satellite is put into orbit.

Because of the high resistance of atmospheric air, it is impractical to attempt the launching of an inflated balloon at speeds required to reach outer space. It is thus known that flexible thin webbed balloons of the order of 100 to 200 feet in diameter can be folded compactly into a canister which is positioned at the nose of an outer space projectile and subsequently be caused to inflate and assume an orbital path around the earth. Small amounts of residual air or subliming solids can provide the requisite pressure for causing the inflation since there is no gas pressure externally of the balloon when it has reached its orbital distance from the earth. This distance is usually from 500 to 1,000 miles for the radio reflective purposes intended and the balloon is then caused to circle the earth in a prescribed path at velocities in the order of 18,000 miles per hour.

Collisions with cosmic dust and the natural permeability of the thin webbed material will permit gas molecules within the balloon to escape. It is thus presumed that a constant internal pressure cannot be maintained to exert distending force upon the balloon. Since there is no atmospheric resistance in space, the balloon tends to keep its distended configuration, even after substantially all of the internal pressure has ceased to exist. There are, however, other factors which cause a distortion of the desired configuration of the space balloon and, since there is no means of repairing and reinflating the balloon in flight, such distortion effects are cumulative. If the balloon is to be used for reflection of electromagnetic waves, a spherical shape is often desirable and any uncontrolled flattening or other distortion is detrimental to the use of the balloon.

One of the serious causes of distortion is solar pressure. The sun's rays are intense in space. Both direct rays and those reflected from the surface of the earth will tend to exert a small, but deforming force on a flexible sheet material such as plastic film. Metal sheets or metal foil laminated plastic sheets have been suggested as materials which will resist deformation due to environmental forces and this invention is directed toward space balloons constructed of metal-plastic type laminates which overcome the problems of deformation by combining the rigid qualities of metal foil with the less rigid qualities of sheet plastic used in laminated combination therewith.

Another serious cause of distortion is the memory of the plastic material in respect of folds and creases necessarily created in the compaction of the balloon prior to launching. Thus, sheet plastic which depends on its own rigidity will tend to wrinkle and revert to bent condition at the places where it was previously folded, and this effect is evident even though the folds and wrinkles are not apparent during the time the initial inflating pressure remains.

It is within the contemplation of this invention and a general object thereof to provide a space balloon structure of the laminated metal-plastic web construction which has been improved in respect to the noted problems and also has been directed to utilization in space communication.

More specifically, it is an object of the invention to provide a foldable metal-plastic sheet laminate balloon which is light in weight and which will be sufficiently rigid in space to resist deforming forces.

A further object of the invention is to provide a space balloon of the noted improved character, which additionally is so constructed as to reduce the pressure effect of solar rays by causing a portion of the rays to be transmitted directly through the balloon.

A still further object of the invention is to provide a deformation resistant space balloon of reduced weight which will have good wave reflective properties for communication purposes.

These and other objects and advantages of this invention will more fully appear from the following description, made in connection with the accompanying drawing, wherein like reference characters refer to the same or similar parts throughout the several views and in which:

FIGURE 1 is a view of the entire satellite in inflated condition, portions being cut-away to show the hollow interior;

FIGURE 2 is a greatly enlarged fragment of the shell portion of the satellite;

FIGURE 3 is a further enlarged cross-sectional segment of the shell taken on the line 3—3 of FIGURE 2;

FIGURE 4 is an alternate form of the invention showing a fragment of a somewhat differently constructed shell; and FIGURE 5 is a further enlarged cross-sectional segment of the alternate form taken on the line 5—5 of FIGURE 4.

Referring now to FIGURE 1, the satellite balloon is indicated generally at 10. While the balloon is shown in a spherical shape, it is understood that any configuration can be usefully employed wherein a laminated sheet construction 11 surrounds an internal space 12 and presents a surface suitable for reflection of radio waves or the like. In the form shown, the balloon 10 is of the gore type wherein spherical segments of the balloon material are joined together at seams 13 as shown. For the purposes described herein, it is important that substantial distances of conducting material be provided and, hence, if the seams 13 are close together, it is intended that they constitute electrical connections from one gore to the next. In the practical application of the invention, ballons of the type disclosed herein have been constructed in diameters of between 100 to 200 feet and it is contemplated that sizes up to 1,000 feet in diameter can be compactly folded and put into orbit while expanding.

The material used in the balloon construction according to the present disclosure constitutes a flexible sheet plastic shell 14 which is constituted of polypropylene, polyethylene terephthalate or other polymeric material which can be produced in this sheets or deposited in thin layers in the order of a few mils or even a fraction of one mil. For the special purposes hereinafter disclosed, a low resistance to the passage of solar rays is highly useful. By way of specific example, a polyethylene terephthalate film of 0.00032 inch thickness was found to be practical. The sheet plastic film does not contribute materially to the rigidity of the balloon structure but is tough and can be prepared to permit the passage of a substantial quantity of solar rays as previously pointed out.

The flexible sheet plastic material 14 has a flexible metal foil laminate 15 attached in surrface contact thereto and the metal foil constitutes the conducting portion of the balloon for the purposes of reflecting radio waves and the like. The metal foil, however, is considerably more heavy than comparable thicknesses of sheet plastic material and, hence, in practical thicknesses for handling will add considerably weight to the balloon material when attached in the manner described. We have found, however, that we can still utilize material such as aluminum foil in thicknesses of 0.00018 inch as a metallic laminate and yet gain the advantages of a light structure which will be rigid enough to retain its shape in a balloon satellite over long periods of time. Furthermore, we can obtain the advantages of a completely continuous conducting surface insofar as the reflection of radio waves are concerned when the balloon 10 is in inflated condition and orbiting about the earth.

Referring now to FIGURE 2, the thermoplastic material 14 has bonded thereto a foraminous metal foil laminate 15, the foraminous configuration being defined by a multiplicity of discontinuous nonconducting opening 16 which leave an interconnected continuous conducting area 17 between the openings. We have found that, even though the weight of metallic foil is thus reduced considerably, the rigidifying effect of the foil remains sufficient to overcome the memory of the creases and folds which would otherwise cause trouble in maintaining the desired configuration of the balloon during its orbital flight. As previously noted, this rigidifying effect is also adequate to resist distortion of the balloon by virtue of the pressure of solar rays.

FIGURE 3 shows a further enlarged cross-sectional segment of the material utilized in FIGURE 2 and in this form of the invention the configuration of the foraminous openings is circular. Further, only one sheet of metal foil laminate 15 is employed. The openings 16 create window areas 18 over the surface of the balloon and in one application these openings were produced in the order of one-eighth to one-quarter inches in effective diameter and the web portions 17 were a minimum of one-eighth inches between the holes 16.

Cooperatively, it will be noted that the window areas 18 of exposed plastic sheet material 14 will create a substantial total area of window space through which solar rays can pass in substantial amount so as to minimize effects of solar pressure.

For the purposes of the instant invention, the openings 16 may be produced in any convenient manner, either mechanically or chemically. It is, of course, possible to produce these openings after the metal foil sheet 15 is bonded to the plastic sheet 14 where chemical etching is employed.

Referring now to FIGURES 4 and 5, another practical form of the invention is shown wherein the sheet plastic shell is designated as 19 and a pair of flexible metal foil laminates 20 and 21 are attached as by bonding to opposed sides of the sheet 19. Also, in the FIGURES 4 and 5, a different configuration of the foraminous openings is shown, the openings being generally diamond shaped and designated by the numeral 22. Here again, the openings 22 are discontinuous while the remaining areas or webs 23 of the metal foil laminates 20 and 21 are continuous in nature. In order to gain full advantage of the reduction of solar ray resistance, the window areas 24 are maximized by causing the openings 22 in each of the foil laminates to lie in registry. While it is possible to form the foraminous openings in the foil sheets prior to attaching to the plastic film, we have found it convenient to bond the metal foil in continuous sheets to each side of the sheet plastic and then chemically mill the openings 22 from unmasked areas which have been previously determined for purposes of registration on each of the two metal foil laminates.

The present invention admits of wide variation in thicknesses of material, configuration of openings and so forth. It is to be noted, however, that where a range of electromagnetic waves such as radio propagated waves are to be reflected from the satellite, such reflection is effective to the extent that the openings (16 or 22 in the two forms noted herein) do not span lengths which are much greater than one-eighth of the smallest wave length to be reflected. Under these circumstances, the metallic surface of the satellite functions almost as though it were solid over the complete surface.

It is further to be observed that once the balloon structure has been inflated in orbit, the presence of openings caused by puncturing action of cosmic dust and the like will not deflate the structure. Since a virtual vacuum obtains both at its interior and exterior, the rigidity of the disclosed material is adequate to prevent distortion after the initial expansion has taken place. The lightness in weight of the herein disclosed satellite structure makes possible the deployment of a large and efficient communications satellite with a noticeable reduction in power requirements of the rocket device utilized to project the satellite into space.

It will, of course, be understood that various changes may be made in the form, details, arrangements and proportions of the parts without departing from the scope of this invention as set forth in the appended claims.

What is claimed is:
1. An electromagnetic wave reflecting space balloon which comprises:
  (a) a single flexible sheet plastic shell adapted to encompass a predetermined volume of space, said sheet plastic having a low resistance to the passage therethrough of solar radiation and
  (b) a flexible metal structure having a rigidity which is relatively greater than that of said flexible sheet plastic and attached in surface contact thereto,
  (c) said metal structure being of foraminous configuration whereby to create a multiplicity of discontinuous nonconducting areas and a continuous interconnected conducting area.

2. An electromagnetic wave reflecting space balloon which comprises:
  (a) a single flexible sheet plastic shell adapted to encompass a predetermined volume of space, said shell permitting the passage therethrough of a substantial portion of solar rays, and
  (b) a flexible metal foil sheet having a rigidity which is relatively greater than the rigidity of said flexible sheet plastic shell and being attached in surface contact to said flexible sheet plastic shell,
  (c) said metal foil sheet having a plurality of spaced bores therethrough and being of discontinuous foraminous configuration whereby to maintain exposed a portion of the sheet plastic shell.

3. An electromagnetic wave reflecting space balloon which comprises:
  (a) a flexible sheet plastic shell adapted to encompass a predetermined volume of space, and
  (b) a pair of flexible metal foil sheets having a rigidity which is relatively greater than that of said shell being attached in surface contact one at each side of said flexible sheet plastic,
  (c) said metal foil sheets being of foraminous configuration whereby to create a multiplicity of discontinuous nonconducting areas and continuous interconnected conducting areas.

4. The structure of claim 3 wherein the discontinuous nonconducting areas at each side of the sheet plastic shell lie in registry whereby to create window areas in said plastic shell.

5. A space balloon for reflecting electromagnetic waves lying within a given range of wave lengths which comprises:
  (a) a flexible, transparent sheet plastic shell adapted to encompass a predetermined volume of space, and
  (b) a flexible metal sheet having a rigidity which is relatively greater than the rigidity of said shell and being attached in surface contact to said flexible sheet plastic shell,
  (c) said metal sheet being of foraminous configuration so constructed and arranged as to create window areas for said sheet plastic shell, said window areas not exceeding in average span a length which exceeds about one-eighth of the shortest of said given range of wave lengths, (d) the space within said sheet plastic shell being transparent to solar radiation whereby a substantial amount of solar radiation impinging on said balloon will pass therethrough.

References Cited

UNITED STATES PATENTS

| | | | |
|---|---|---|---|
| 3,047,860 | 7/1962 | Swallow | 343—18 |
| 3,034,121 | 5/1962 | Riblet | 343—895 |
| 3,184,742 | 5/1965 | Cutler | 343—18 |

OTHER REFERENCES

"Going Up," Electronics Illustrated, January 1962, volume 5, p. 14.

RODNEY D. BENNETT, JR., *Primary Examiner.*

D. C. KAUFMAN, *Assistant Examiner.*

U.S. Cl. X.R.

343—915